(12) United States Patent
Geltinger

(10) Patent No.: US 11,577,445 B2
(45) Date of Patent: Feb. 14, 2023

(54) ADAPTABLE BLOW MOULD

(71) Applicant: KRONES AG, Neutraubling (DE)

(72) Inventor: Florian Geltinger, Donaustauf (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/500,200

(22) PCT Filed: Apr. 12, 2018

(86) PCT No.: PCT/EP2018/059402
§ 371 (c)(1),
(2) Date: Oct. 2, 2019

(87) PCT Pub. No.: WO2018/189300
PCT Pub. Date: Oct. 18, 2018

(65) Prior Publication Data
US 2021/0094219 A1   Apr. 1, 2021

(30) Foreign Application Priority Data
Apr. 12, 2017 (DE) .................... 10 2017 107 950.5

(51) Int. Cl.
*B29C 49/48* (2006.01)

(52) U.S. Cl.
CPC ...... *B29C 49/48* (2013.01); *B29C 2049/4858* (2013.01); *B29C 2049/4892* (2013.01)

(58) Field of Classification Search
CPC ............ B29C 49/48; B29C 2049/4858; B29C 2049/4892; B29C 49/30; B29C 49/42; B29C 33/04; B29C 49/62; B29C 49/64
See application file for complete search history.

(56) References Cited

U.S. PATENT DOCUMENTS 6,116,888 A * 9/2000 Johnston ............. B29C 33/3835
425/195
7,887,315 B2   2/2011 Lane
(Continued)

OTHER PUBLICATIONS

German Search Report dated Feb. 19, 2018 issued in corresponding German Application No. 10 2017 107 950.5.
(Continued)

*Primary Examiner* — Jeffrey M Wollschlager
*Assistant Examiner* — Shibin Liang
(74) *Attorney, Agent, or Firm* — Onello & Mello, LLP

(57) ABSTRACT

The invention relates to a blow mould for transforming plastic parisons to form plastic containers, having a base part, a first side part and a second side part, wherein, in the assembled state of the blow mould, this base part together with the side parts form a hollow space, within which the plastic parisons can be expanded to form the plastic containers. According to the invention, at least one element of the blow mould has a first fastening section to which a first adapter element can be attached, which adapter element facilitates changing of the blow mould by means of a robot device, wherein this fastening section is formed in such a way that this adapter element can be attached releasably to this fastening section, and wherein this fastening section is formed in such a way that the blow mould can be arranged both with this adapter element and also without this adapter element on a transforming device for transforming plastic parisons to form plastic containers.

16 Claims, 1 Drawing Sheet

(56) References Cited

U.S. PATENT DOCUMENTS

| | | |
|---|---|---|
| 8,974,211 B2 | 3/2015 | Cirette et al. |
| 9,248,602 B2 | 2/2016 | Pasquier et al. |
| 9,821,506 B2 | 11/2017 | Geltinger et al. |
| 9,873,222 B2 | 1/2018 | Blochmann |
| 9,975,303 B2 | 5/2018 | Geltinger et al. |
| 2008/0181982 A1 | 7/2008 | Lane |
| 2012/0161349 A1 | 6/2012 | Pasquier et al. |
| 2014/0004219 A1 | 1/2014 | Cirette et al. |
| 2015/0132430 A1 | 5/2015 | Cirette et al. |
| 2015/0145178 A1* | 5/2015 | Blochmann ............. B29C 49/30 264/523 |
| 2015/0306828 A1 | 10/2015 | Geltinger et al. |
| 2015/0343696 A1 | 12/2015 | Geltinger et al. |

OTHER PUBLICATIONS

International Search Report and Written Opinion dated Aug. 13, 2018 issued in corresponding International Application No. PCT/EP2018/059402, with English translation of Search Report.

\* cited by examiner

ADAPTABLE BLOW MOULD

The present invention relates to a blow mould for transforming plastic parisons into plastic containers. It is known from the prior art that plastic parisons are first of all heated and then are delivered in a heated state to a blow mould. Inside this blow mould these plastic parisons are acted upon by a gaseous medium and in particular compressed air in order thus to be blow moulded. For this purpose, in the prior art blow moulds are used which usually consist of a plurality of components. These blow moulds usually have a base part as well as two side parts, which together form a hollow space, inside which the plastic parisons are expanded to form the plastic containers. If different containers are to be blow moulded with the aid of a blow moulding machine, it is necessary to change the individual blow moulds of a blow moulding machine. This is sometimes a relatively inconvenient process.

More recently so-called changing robots which carry out changing of blow moulds semi-automatically or fully automatically have also become known from the prior art. For this purpose the blow moulds have elements and the like which in the first place facilitate changing by means of changing robots, for instance elements which are gripped by the robot gripper, in order to be able to replace the blow mould.

On the other hand, however, machines are also known in which this change is carried out manually.

In the blow moulds according to the prior art a customer or manufacturer must specify a changing process from the start, that is to say for example automatic changing of the blow moulds or manual changing of the blow moulds. Later retrofitting or conversion of the moulds for manual changing to moulds for automatic changing has not been possible hitherto. It would also be possible to configure the respective blow mould basically in the more complex mould which is suitable for automatic changing. However, regardless of the later application, this would lead to additional costs due to additional attachments.

Therefore the object of the present invention is to provide a blow mould which can be used in a variety of way. This object is achieved according to the invention by the subject matter of the independent claim. Advantageous embodiments and further developments form the subject matter of the subordinate claims.

A blow mould according to the invention for transforming plastic parisons into plastic containers comprises a base part, a first side part and a second side part, wherein in an assembled state this base part with the side parts form a hollow space within which the plastic parisons can be expanded to form the plastic containers.

According to the invention at least one element of the blow mould has a first fastening section, to which a first adapter element can be attached, the adapter element being suitable and intended to carry out a change of the blow mould (in particular removal from a support or mounting on a support) manually and/or semi-automatically and/or automatically and/or with robot assistance, and/or the adapter element serving in particular for gripping the blow mould by means of a robot device.

In this case this fastening section is formed in such a way that this adapter element can be attached releasably to this fastening section, and wherein this fastening section is furthermore formed in such a way that the blow mould can be arranged both with this adapter element and also without this adapter element on a transforming device for transforming plastic parisons to form plastic containers.

More precisely it is possible to attach the blow mould, both with and also without the adapter element, to a transforming station for transforming plastic parisons into plastic containers and in particular plastic bottles. This transforming station preferably has two side part supports, on which the side parts of the blow mould can be mounted indirectly (with a mould support shell between the mould support and the blow mould) or directly (the blow mould is arranged directly on the mould support). This transforming station preferably also has a base part support on which the base part of the blow mould can be mounted. These side part supports are pivotable with respect to one another and with respect to a predetermined pivot axis for opening and closing the blow mould. Furthermore, these transforming stations preferably have an application device in order to apply compressed air to the plastic parisons.

An assembled state of the blow mould is understood, in particular in an operating mode, to be a closed state of the blow mould in which the side parts together with the base part form the said hollow space. Thus, for example, an internal contour of these side parts and of the base part can be adapted to a contour of a container to be produced.

The adapter element which is suitable and intended to facilitate changing of the blow mould is preferably selected from a group of adapter elements which facilitate transport of the blow mould by means of a robot device, adapter elements which facilitate an automatic and/or robot-assisted release of fastening mechanisms and adapter elements which facilitate in particular a positively engaging cohesion of elements of the blow mould.

Due to the procedure according to the invention, a changeover of the blow mould device both to a manual change of blow mould and also to a robot-assisted change of blow mould is possible. The fastening section is preferably placed so that the blow mould, with or without adapter, can be installed in a transforming device. In this case, without the adapter element the blow mould is preferably designed for a manual change of blow mould. With an adapter element the blow mould is preferably designed for the automatic change of blow mould.

Furthermore the blow mould preferably has one or more fastening devices, in order to fasten the side parts and/or the base part on a side part support and/or on a base part support.

It is therefore proposed that the blow mould according to the invention has a modular construction. The blow mould has a basic mould which is intended in particular for a manual mould change. In this case, however, this basic shape already has all interfaces in order to install the adapter elements. In a further preferred embodiment the fastening device and in particular the fastening section has interfaces which are selected from a group of interfaces which includes flange surfaces, threads, centring diameters, peg holes and the like. In this way attachments, such as the adapter elements described here, can be installed on this basic mould without a modification of the basic mould body.

In this way the mould can be augmented by the mounting of these attachments for a fully automatic mould change and in particular a mould change by means of robots. These adapter elements or attachments advantageously have several functions. In this case these elements are selected from a group of elements, which includes elements for fixing the mould in a receptacle, elements for facilitating a positively engaged connection of the side parts to the base mould, elements for positioning the blow mould vertically in a receptacle, elements for positioning the mould in the receptacle in the angular position, elements for forming an interface to a robot gripper, and elements for producing an automatic connection of media feed lines.

In a further advantageous embodiment at least one side part of the blow mould has the fastening section. Preferably at least one fastening section and preferably several fastening sections and particularly preferably all fastening sections is/are selected or configured in such a way that the adapter elements arranged thereon do not contact one another in a normal operating mode of the blow mould. The fastening sections are also preferably designed in such a way.

In a further advantageous embodiment the adapter element facilitates changing of the blow mould by a robot device. In this case the adapter element can be configured in such a way that it also allows a more imprecise positioning of the mould by a robot device. In this case it is possible that centring means are provided which centre the blow mould relative to the side part supports. These centring means may be for example catch bevels which centre the blow mould and/or the mould support relative to the respective other component. In this case these centring means and in particular these catch bevels can be arranged both and preferably on the side part supports and also on the side parts.

This means that a corresponding adapter element can be arranged on this fastening section of the side part. Preferably the second side part of the blow mould also has a fastening section in order to arrange an adapter element thereon. In this way the side parts can be changed individually from a manual variant to a robot-capable variant.

In a further advantageous embodiment the base part and/or a side part and preferably at least one side part and particularly preferably both side parts have a second fastening section to which a second adapter element can be attached. In this way the base part can also be changed over between a manual variant and a variant which can be actuated or handled by robot. In this case this second adapter element can also serve in order to hold individual parts of the blow mould, such as in particular the side parts and the base part temporarily against one another, in particular during transport of the blow mould by means of a robot device. In this case it is conceivable that this adapter element has a fastening mechanism which does not act during operation, but only if the blow mould is to be transported.

A configuration of the adapter elements is preferably adapted to a configuration of the basic mould or the blow mould. Thus the adapter elements can be configured in such a way that they engage in complementary counterpart surfaces of the blow mould or of the basic mould body. In a preferred embodiment the fastening sections can have a stepped construction and/or a stepped shoulder, on which the adapter elements are arranged or fastened.

In a further advantageous embodiment at least one adapter element can be attached by means of at least one screw connection to the fastening section associated therewith. In this way it is possible for the adapter element to be releasably fastened on the respective main body or the blow mould part, for example a side part or the base part.

In a further advantageous embodiment at least one fastening section has a support surface in the shape of a circular segment for application of the first adapter element. In a further advantageous embodiment these adapter elements are designed in such a way that a positively engaged connection for the respective function is produced. For example, as mentioned above, the function may be fixing of the blow mould and centring of the blow mould, in order to deal with handling of the mould by means of a robot and the like.

In a further advantageous embodiment at least one fastening section is arranged in an upper third of the blow mould, preferably in an upper quarter of the blow mould. This means that the adapter element is preferably also arranged in the said upper region of the blow mould.

In a further advantageous embodiment at least one fastening section is also arranged in a lower third of the blow mould, preferably in a lower quarter of the blow mould. In this embodiment it is possible that a further adapter element is arranged in a lower region of the blow mould.

In a further advantageous embodiment the blow mould has at least one third fastening section in order to fasten a third adapter element to a circumferential surface of at least one side part. This third adapter element can serve for example in order to be able to grip the side parts on the external circumference. In addition, this third adapter element can also serve in order to release a fastening between the side part support and the side part for example by means of an additionally connection. Thus for example a pneumatic connection or a pneumatic link can be produced by means of this third adapter element.

Thus the interfaces or adapter elements which function as an interface to a robot gripper are preferably attached to an upper third of the blow mould.

In a further advantageous embodiment the adapter elements are produced from a hardened material, in particular from a hardened steel. In this way a corresponding wear resistance for the robot handling can be ensured.

In a further advantageous embodiment at least one adapter element is suitable and intended for producing a positively engaged connection of the two side parts to the base mould or the base part. Such adapter elements are preferably designed in such a way that they do not come into contact with one another during the actual production of the container, but only if a robot holds the blow mould or the mould set.

Thus it is preferably possible that a contour of these positively engaged elements is integrated directly into a shaping component of the mould side parts and/or of the base part. In this way additional costs due to additional components can be avoided. Thus it is for example possible that the adapter element which produces the positively engaged connection between the base part and the side part is formed in two parts, has for example two semicircle segments. These can be fastened to the side parts, but preferably contact one another only if the blow mould is to be removed by a robot.

In a preferred embodiment the positively engaged connections, in particular those which connect the base and side moulds to the robot only in the changing process, are integrated directly into the shaping components (which are in particular aluminium components) of the side part and base mould. As a result additional components can be omitted and the production costs remain low. This positively engaged connection preferably acts only in the changing process if the side parts are removed with the base as a set, but not in the production process.

In the production process this positively engaged connection preferably has a predetermined clearance (wear resistance) and the positively engaged connection for transmission of the forces resulting from the blow moulding process preferably takes place by means of additional hardened elements below the base cup. Therefore connecting mechanisms are preferably provided which produce a mechanical connection between components of the blow mould only in an installation and/or removal mode of the apparatus, but not in an operating mode of the apparatus.

Therefore in a further advantageous embodiment at least one adapter element is formed in two parts.

In a further advantageous embodiment the blow moulding arrangement has a second or further adapter element which can be arranged spaced apart from the first adapter element on the blow mould.

In this case in particular the adapter elements are spaced apart from one another in a longitudinal direction of the blow mould.

Further advantages and embodiments are apparent from the appended drawings.

In the drawings:

FIG. 1b shows adapter elements for the blow mould shown in FIG. 1a;

Figure 1A:
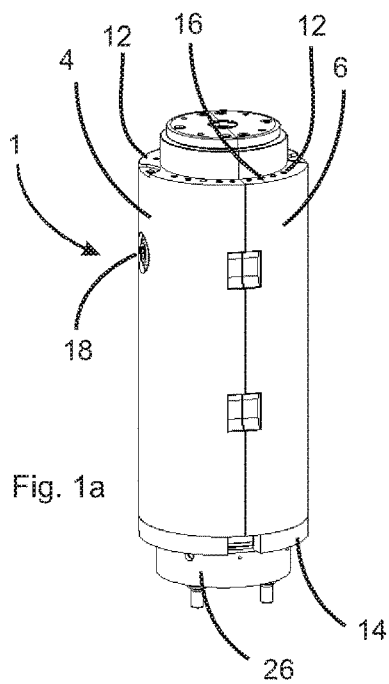
FIG. 1a shows a blow mould according to the invention.

FIG. 1a shows a representation of a blow mould 1 according to the invention. In this case this blow mould 1 has a first side part 4 and a second side part 6. In addition, the blow mould has a base part located in the interior. These side parts 4, 6 and the base part 2 together form the hollow space inside which the plastic parisons are expanded.

The reference numeral 12 designates a fastening section which in each case is arranged on the two side parts. This fastening section is formed here as an annular (and stepped) edge which has a plurality of bores 16 which serve for screwing to an adapter element.

The reference numeral 18 designates a further fastening section, on which for example couplings can be arranged. These couplings can be for example facilitate an automatic release of parts of the blow mould and in particular release of the blow mould from the mould support. The reference numeral 14 designates a third fastening section which may serve for arrangement of a further adapter element. The reference numeral 26 designates a base support which serves to support the base part 2.

Figure 1B:
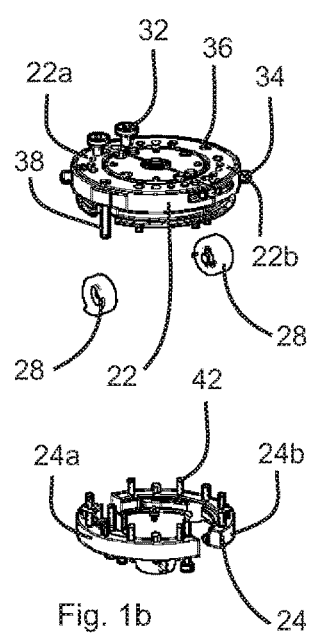

FIG. 1b shows the individual adapter elements. In this case the reference numeral 22 relates to the first adapter element which is arranged on the fastening section 12. In this case this first adapter element 22 has a centring pin 38 which engages in a corresponding bore of the side part. In addition two gripping projections 32 which can be gripped by a robot arm are provided. Furthermore, the adapter element has two lateral projections 34 which likewise serve for handling by a robot.

In a preferred embodiment the adapter element 22 has two sections 22a, 22b which can be fastened in each case to the two side parts 4, 6. In this case these two sections 22a, 22b in each case preferably have a semi-circular construction.

For the purpose of transporting the blow moulds, these sections 22a, 22b can be connected to one another (in particular by positive engagement), in order thus also to connect the two side parts 4, 6 to one another.

The reference 28 designates a further adapter element which is arranged in particular on the fastening section 18 which is located on the external circumference of the blow mould. Fastening mechanisms can be closed and/or released automatically in particular by means of this adapter element.

The reference 24 designates the second adapter element which can be fastened in particular to the underside of the side parts. This adapter element serves primarily in order to arrange the unit consisting of side parts 4, 6 and base part on a support in the blow moulding station. In this case this adapter element 24 can produce a positively engaged connection between the two side parts. In this case it will be recognised that this second adapter element 24 is also formed in two parts, wherein one part 24a is fastened to a side part and the other part 24b is fastened to a further side part 6. In this case this second adapter element can be formed in such a way that both parts 24a, 24b thereof can be connected to one another and/or in such a way that these parts produce an in particular positively engaged connection between the side parts 4, 6 and the base part 2.

Figure 1C:
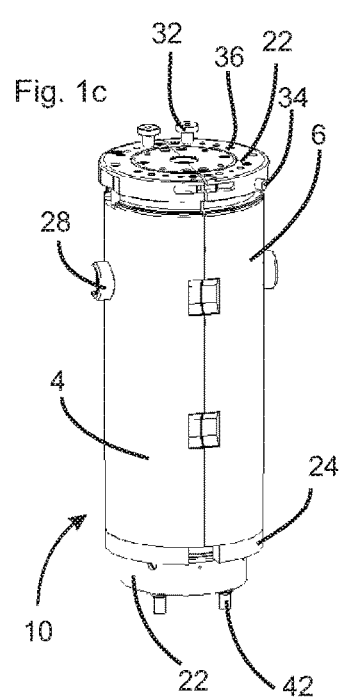
FIG. 1c shows a blow mould with adapter elements arranged thereon.

FIG. 1c shows a blow mould 1 which is equipped with the individual adapter elements 22, 24 and 28. Thus the abovementioned blow moulding arrangement 10 is illustrated here.

Figure 2:
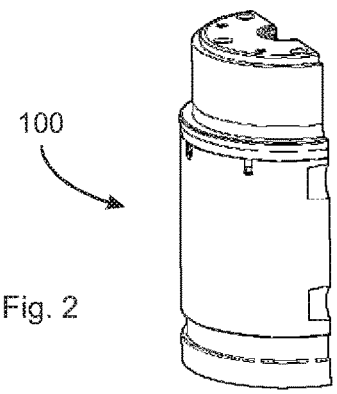
FIG. 2 shows a blow mould side part according to the prior art.

FIG. 2 shows a blow mould according to the prior art. It will be recognised that this blow mould has no possibility for fastening of an adapter element to it.

Figure 3:
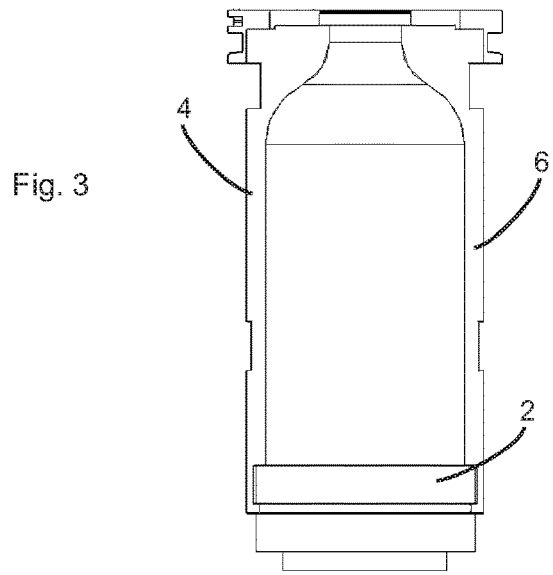
FIG. 3 shows a schematic representation of a blow mould.

FIG. 3 shows a schematic representation of a blow mould. This has two side parts 4 and 6 as well as a base part 2. In this case this base part 2 is held by the two side parts, which can take place in particular by form fitting. In this case fixing means for holding the base part 2 are integrated in each case into the side parts 4, 6.

The applicant reserves the right to claim all the features disclosed in the application documents as essential to the invention in so far as they are individually or in combination novel over the prior art. Furthermore it is pointed out that features which may be advantageous per se have also been described in the individual drawings. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 blow mould
2 base part
4 first side part
6 second side part
10 blow moulding arrangement
12 first fastening section
14 second fastening section
16 bores
18 third fastening section
22 first adapter element
22a section of the first adapter element 22
22b section of the first adapter element 22
24 second adapter element
24a part of the second adapter element
24b part of the second adapter element
26 base support
28 further adapter element
32 gripping projections
34 lateral projections
38 centring pin
44 blow mould shell element, support shell
46 fastening section
50 locking mechanism
52 temperature control media connection
54 media connection
55 further locking element
56 media connection
58 media connection

The invention claimed is:

1. A blow mould, comprising:
    a base part;
    a first side part; and
    a second side part, wherein:
        in an assembled state of the blow mould, the base part together with the first and second side parts form a hollow space within which plastic parisons are expanded to form plastic containers; and
    at least one of the first and second side parts comprises:
        a fastening section constructed and arranged for the blow mould to have a first configuration for a manual change operation; and
        an adapter element removably coupled to the fastening section for the blow mould to have a second configuration for a robot-assisted operation, the fastening section further constructed and arranged for installing the blow mould in a transforming device absent the adapter element.

2. The blow mould according to claim 1, wherein the fastening section includes at least one interface to the transforming device selected from a group including flange surfaces, threads, centering diameters, and peg holes.

3. The blow mould according to claim 1, wherein the fastening section has a stepped construction and/or a stepped shoulder.

4. The blow mould according to claim 1, wherein the adapter element facilitates changing of the blow mould by a robot device.

5. The blow mould according to claim 1, wherein the base part and/or a side part has a second fastening section to which a second adapter element can be attached.

6. The blow mould according to claim 1, wherein at least one adapter element can be attached by means of at least one screw connection to the associated fastening section.

7. The blow mould according to claim 1, wherein at least one fastening section has at least one bearing surface in the form of a circular segment for application of the adapter element.

8. The blow mould according to claim 1, wherein at least one fastening section is arranged in an upper third of the blow mould.

9. The blow mould according to claim 1, wherein the blow mould has at least one third fastening section in order to fasten a third adapter element to a circumferential surface of at least one side part.

10. The blow moulding arrangement with a blow mould according to claim 1 and with at least one adapter element, which is suitable and intended to grip the blow mould by means of a robot device.

11. The blow mould arrangement according to claim 10, wherein the blow mould arrangement has a second adapter element which can be arranged spaced apart from the first adapter element on the blow mould.

12. The blow mould according to claim 1, wherein at least one fastening section is arranged in an upper quarter of the blow mould.

13. The blow mould according to claim 1, wherein the blow mould has one or more fastening devices configured to mate with one or more adapters, in order to fasten the side parts and/or the base part on a side part support and/or on a base part support.

14. The blow mould according to claim 1, wherein at least one side part of the blow mould has the fastening section.

15. A blow mould for transforming plastic parisons to form plastic containers, having a base part, a first side part and a second side part, wherein, in the assembled state of the blow mould, this base part together with the side parts form a hollow space, within which the plastic parisons can be expanded to form the plastic containers, wherein at least one element of the blow mould to which an adapter element can be attached has a fastening section including a first fastening section, the adapter element facilitating a fully automatic and/or semi-automatic and/or manual changing of the blow mould, wherein this fastening section is designed in such a way that this adapter element can be releasably attached to this fastening section, and wherein this fastening section is formed in such a way that the blow mould can be arranged both with this adapter element and also without this adapter element on a transforming device for transforming plastic parisons to form plastic containers and wherein the fastening section is placed so that the blow mould, with or without adapter, can be installed in a transforming device, wherein in this case, without the adapter element the blow mould is designed for a manual change of blow mould and wherein with an adapter element the blow mould is designed for the automatic change of blow mould, the fastening section further constructed and arranged for installing the blow mould in a transforming device absent the adapter element.

16. A blow mould for transforming plastic parisons to form plastic containers, having a base part, a first side part and a second side part, wherein, in the assembled state of the blow mould, this base part together with the side parts form a hollow space, within which the plastic parisons can be expanded to form the plastic containers, wherein at least one element of the blow mould to which an adapter element can be attached has a fastening section including a first fastening section, the adapter element facilitating a fully automatic and/or semi-automatic and/or manual changing of the blow mould, wherein this fastening section is designed in such a way that this adapter element can be releasably attached to this fastening section, and wherein this fastening section is formed in such a way that the blow mould can be arranged both with this adapter element and also without this adapter element on a transforming device for transforming plastic parisons to form plastic containers and wherein the adapter element which is suitable and intended to facilitate changing of the blow mould is selected from a group of adapter elements which facilitate an automatic and/or robot-assisted release of fastening mechanisms and adapter elements which facilitate cohesion of elements of the blow mould, the fastening section further constructed and arranged for installing the blow mould in a transforming device absent the adapter element.

* * * * *